| (12) | United States Patent | (10) Patent No.: | US 9,021,906 B2 |
|---|---|---|---|
| | Dreibholz et al. | (45) Date of Patent: | May 5, 2015 |

(54) DOUBLE CLUTCH TRANSMISSION HAVING A LAYSHAFT DESIGN

(75) Inventors: Ralf Dreibholz, Meckenbeuren (DE);
Juergen Wafzig, Eriskirch (DE);
Michael Wechs, Lindau (DE); Markus Renninger, Oerlenbach (DE); Thomas Rosemeier, Meckenbeuren (DE);
Johannes Kaltenbach, Friedrichshafen (DE); Rudolf Kauffeldt, Bodolz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 160 days.

(21) Appl. No.: 13/822,006

(22) PCT Filed: Aug. 3, 2011

(86) PCT No.: PCT/EP2011/063334
§ 371 (c)(1),
(2), (4) Date: Mar. 11, 2013

(87) PCT Pub. No.: WO2012/034779
PCT Pub. Date: Mar. 22, 2012

(65) Prior Publication Data
US 2013/0160588 A1  Jun. 27, 2013

(30) Foreign Application Priority Data
Sep. 13, 2010  (DE) .......................... 10 2010 040 660

(51) Int. Cl.
*F16H 3/08* (2006.01)
*F16H 3/00* (2006.01)
(Continued)

(52) U.S. Cl.
CPC ................ *F16H 3/006* (2013.01); *F16H 3/083* (2013.01); *Y10T 74/19233* (2015.01); *B60K 2006/4808* (2013.01); *B60K 2006/4825* (2013.01); *B60K 2006/4841* (2013.01);
(Continued)

(58) Field of Classification Search
USPC ....................................................... 74/330, 331
See application file for complete search history.

(56) References Cited

U.S. PATENT DOCUMENTS 4,658,663 A * 4/1987 Hiraiwa .......................... 74/359
6,209,406 B1 * 4/2001 Sperber et al. .................. 74/330
(Continued)

FOREIGN PATENT DOCUMENTS

DE  10 2005 005 163 A1  9/2006
DE  10 2006 007 010 A1  8/2007
(Continued)

*Primary Examiner* — Ha D Ho
(74) *Attorney, Agent, or Firm* — Davis & Bujold, P.L.L.C.; Michael J. Bujold (57) ABSTRACT

A double clutch transmission of countershaft design having a central shaft and a concentric hollow transmission shaft, one countershaft, and two power-shift elements. Two hollow shafts are disposed on the countershaft coaxially to the countershaft, each of which can be fixed, via one shift device, to the countershaft, and to which at least two gearwheels are fixed. A further hollow shaft is coaxially provided on either the central or hollow transmission shafts and can be connected, via a shift device, to the central or hollow transmission shaft, and to which at least two further gearwheels of the gear stages are fixed. At least three transmission ratios are possible by engaging three of the gear stages on the shift-element side into the power flow, thereby enabling one transmission ratio to be at least partially implemented by a respective sole engagement on the shift-element side into the power flow.

35 Claims, 5 Drawing Sheets

(51) Int. Cl.
*F16H 3/083* (2006.01)
*B60K 6/48* (2007.10)
*F16H 3/093* (2006.01)

(52) U.S. Cl.
CPC ............... *F16H 2003/0803* (2013.01); *F16H 2003/0933* (2013.01); *F16H 2200/006* (2013.01); *F16H 2200/0065* (2013.01); *Y02T 10/6252* (2013.01); *Y02T 10/626* (2013.01)

(56) References Cited

U.S. PATENT DOCUMENTS

| | | | |
|---|---|---|---|
| 7,040,186 B2 * | 5/2006 | Pollak | 74/330 |
| 7,231,843 B2 * | 6/2007 | Gumpoltsberger et al. | 74/329 |
| 7,421,919 B2 | 9/2008 | Gumpoltsberger et al. | |
| 7,472,617 B2 * | 1/2009 | Nicklass | 74/340 |
| 2004/0093972 A1 * | 5/2004 | Gumpoltsberger et al. | 74/325 |
| 2006/0048594 A1 | 3/2006 | Gumpoltsberger et al. | |
| 2007/0214904 A1 | 9/2007 | Ohnemus | |
| 2010/0192717 A1 | 8/2010 | Gitt | |
| 2010/0206107 A1 | 8/2010 | Gumpoltsberger et al. | |
| 2011/0030488 A1 | 2/2011 | Gumpoltsberger et al. | |

FOREIGN PATENT DOCUMENTS

| | | |
|---|---|---|
| DE | 10 2007 040 449 A1 | 3/2009 |
| DE | 10 2007 049 271 A1 | 4/2009 |
| FR | 2 934 659 A1 | 2/2010 |
| WO | 2006/084555 A1 | 8/2006 |
| WO | 2008/058858 A1 | 5/2008 |
| WO | 2010/015748 A1 | 2/2010 |

* cited by examiner

Fig. 2

| | K1 | K2 | S9 | S7 | S2 | S3 | S8 | S4 | S6 | S1 | S5 | S10 |
|---|---|---|---|---|---|---|---|---|---|---|---|---|
| "1" |   | X | X | X |   |   |   |   |   |   |   |   |
| "2" | X |   | X |   | X | X |   |   |   |   |   |   |
| "3" |   | X |   |   | X |   | X |   |   |   |   |   |
| "4" | X |   |   |   |   | X |   | X |   |   |   |   |
| "5" |   | X |   | X |   |   |   |   |   |   |   |   |
| "6" | X |   |   |   |   |   |   |   | X | X |   |   |
| "7" |   | X |   |   |   |   |   | X |   |   | X |   |
| "8" | X |   |   |   |   |   | X |   | X | X |   |   |
| "9" |   | X |   |   |   |   |   |   |   |   |   |   |
| "R" |   |   |   | X |   |   |   |   |   |   |   | X |

Fig. 4

| Shift device | Gear stage |
|---|---|
| S1 | ZP6 |
| S2 | ZP2 |
| S3 | ZP2 |
| S4 | ZP4 |
| S5 | ZP7 |
| S6 | ZP5 |
| S7 | ZP5 |
| S8 | ZP9 |
| S9 | ZP3 |
| S10 | ZPR |

| | K1 | K2 | S9 | S7 | S1 | S3 | S8 | S4 | S6 | S2 | S5 | S10 |
|---|---|---|---|---|---|---|---|---|---|---|---|---|
| "1" |   | X | X | X |   |   |   |   |   |   |   |   |
| "2" | X |   | X |   | X |   |   |   |   |   |   |   |
| "3" |   | X |   |   | X | X |   |   |   |   |   |   |
| "4" | X |   |   | X |   |   | X | X |   |   |   |   |
| "5" |   | X |   |   |   | X |   |   | X |   |   |   |
| "6" | X |   |   | X |   |   |   |   |   | X | X |   |
| "7" |   | X |   |   |   |   |   | X |   | X |   |   |
| "8" | X |   |   |   |   |   | X |   | X |   |   |   |
| "9" |   | X |   |   |   |   |   |   |   |   |   |   |
| "R" |   | X |   | X |   |   |   |   |   |   |   | X |

Fig. 3

| Shift device | Gear stage |
|---|---|
| S1 | ZP2 |
| S2 | ZP6 |
| S3 | ZP6 |
| S4 | ZP8 |
| S5 | ZP7 |
| S6 | ZP5 |
| S7 | ZP5 |
| S8 | ZP9 |
| S9 | ZP3 |
| S10 | ZPR |

DOUBLE CLUTCH TRANSMISSION HAVING A LAYSHAFT DESIGN

This application is a National Stage completion of PCT/EP2011/063334 filed Aug. 3, 2011, which claims priority from German patent application serial no. 10 2010 040 660.0 filed Sep. 13, 2010.

FIELD OF THE INVENTION

The invention relates to a double clutch transmission having a countershaft design.

BACKGROUND OF THE INVENTION

A double clutch transmission having a countershaft design for implementing various transmission ratios for forward driving and travel in reverse, known from practical applications, is equipped with a central transmission shaft, a hollow transmission shaft disposed concentrically thereto, a countershaft, and two power-shift elements. Both of the power-shift elements are operatively connected on the input side to a drive assembly. One of the two power-shift elements is connected on the output side to the central transmission shaft, while the other of the two power-shift elements is connected on the output side to the hollow transmission shaft. The central transmission shaft and the hollow transmission shaft can be connected to the countershaft in order to implement a transmission ratio via gear stages that can be engaged into and disengaged from the power flow via shift devices. In addition, two gear stages are assigned to each of a plurality of shift devices.

A double clutch transmission comprising a double clutch, the input side of which can be driven by a drive shaft of a drive motor, and the output sides of which each have a drive connection to one of two coaxially disposed transmission input shafts, is known from DE 10 2005 005 163 A1. The double clutch transmission comprises an intermediate shaft, or exactly one countershaft, and has fixed gears and idler gears, which are fastened or rotatably supported on shafts, and shifting groups assigned to the idler gears. The idler gears can be connected to the particular dedicated shaft in a rotationally fixed manner via the shifting groups in order to implement transmission ratios or transmission ratio steps. The shifting groups are each assigned to two speeds, which are not in direct succession.

However, only seven transmission ratios for forward travel can be implemented using the two double clutch transmissions described above, thereby preventing drive motors, in particular internal combustion engines, that can be coupled to the double clutch transmissions, from being operated to the desired extent in the optimum operating range thereof in respect, in particular, to the available tractive force and low fuel consumption, across a large operating range of the drive motors.

Document DE 10 2007 049 271 A1 describes a double clutch transmission comprising at least two countershafts, in order to implement a plurality of transmission ratios for forward travel and travel in reverse.

Since the double clutch transmission is designed with two countershafts, a larger radial construction space is required therefore, as compared to double clutch transmissions comprising one countershaft; the larger radial construction space is not available to the necessary extent in various vehicle systems.

SUMMARY OF THE INVENTION

Therefore, the problem addressed by the present invention is that of providing a double clutch transmission having a countershaft design, which requires little construction space in the radial direction and in the axial direction, and by way of which more than seven transmission ratios for forward travel can be implemented.

The double clutch transmission having a countershaft design according to the invention is equipped with a central transmission shaft, a hollow transmission shaft disposed concentrically thereto, exactly one countershaft, and two power-shift elements. Both of the power-shift elements, as start-up elements of the double clutch transmission, can be operatively connected on the drive side to a drive assembly. One of the two power-shift elements is connected on the output side to the central transmission shaft, while the other of the two power-shift elements is connected on the output side to the hollow transmission shaft. Therefore, a speed of rotation of the drive assembly can be transferred either to the central transmission shaft or to the hollow transmission shaft via selective engagement of the two power-shift elements. The central transmission shaft and the hollow transmission shaft can be connected to the countershaft in order to implement a transmission ratio via gear stages that can be engaged into and disengaged from the power flow via shift devices. In addition, at least two gear stages are assigned to each of a plurality of shift devices.

According to the invention, two hollow shafts are disposed on the countershaft coaxially thereto, each of which can be coupled in a rotationally fixed manner via one of the shift devices to the countershaft, and to which at least two gearwheels of the gear stages are connected in a rotationally fixed manner. A further hollow shaft is provided on the central transmission shaft or the hollow transmission shaft, being disposed coaxially thereto, the further hollow shaft being connectable via one of the shift devices to the central transmission shaft or the hollow transmission shaft, and to which at least two further gearwheels of the gear stages are connected in a rotationally fixed manner. At least three transmission ratios can be implemented by engaging three of the gear stages in each case on the shift-element side into the power flow, thereby enabling one transmission ratio to be at least partially implemented in each case by the respective sole engagement on the shift-element side into the power flow.

The embodiment of the double clutch transmission according to the invention comprising exactly one countershaft and a hollow shaft disposed on the central transmission shaft or the hollow transmission shaft, and the further hollow shafts provided on the countershaft, in combination with the provision of at least three transmission ratios as so-called winding path gears, makes it possible to implement a multiplicity of transmission ratios, preferably at least nine transmission ratio steps for forward travel, with a minimum requirement on radial and axial construction space and a low overall weight of the double clutch transmission, and makes it possible to operate a drive motor, preferably an internal combustion engine, to the desired extent in the optimum operating range thereof.

Moreover, due to the multiple uses of the shift devices, the transmission ratios can be implemented using a low number of actuators for actuating the shift devices, thereby also making it possible to produce the double clutch transmission at low cost.

In addition, due to the embodiment of the double clutch transmission according to the invention, the double clutch transmission is characterized by good power-shiftability and can be combined with an electric machine in a structurally simple manner.

In a further embodiment of the double clutch transmission according to the invention that is favorable in terms of construction space, the central transmission shaft or the hollow transmission shaft is designed in sections, and a first transmission subshaft of the central transmission shaft or the hollow transmission shaft can be coupled via one of the shift devices to a second transmission subshaft of the central transmission shaft or the hollow transmission shaft, and one of the transmission subshafts is connected to one of the two shift-element halves of the power-shift elements, wherein three of the gear stages can be coupled or are coupled to the other transmission subshaft via one of the shift devices, and an additional gear stage can be coupled to the other transmission subshaft via one of the shift devices.

In an alternative embodiment of the double clutch transmission according to the invention that is also favorable in terms of construction space, a further hollow shaft is disposed on the central transmission shaft or the hollow transmission shaft, which can be coupled to either one thereof by means of one of the shift devices, and to which three of the gear stages are connected, while a further gear stage can be connected or is connected to the central transmission shaft or the hollow transmission shaft via one of the shift devices, and an additional gear stage can be coupled to the central transmission shaft or the hollow transmission shaft via one of the shift devices.

In another alternative embodiment of the double clutch transmission having a countershaft design according to the invention, which comprises a central transmission shaft having a hollow transmission shaft disposed concentrically thereto, exactly one countershaft, and two power-shift elements, it is possible for both of the power-shift elements, as start-up elements of the double clutch transmission, to be operatively connected on the drive side to a drive assembly. One of the two power-shift elements is connected on the output side to the central transmission shaft, while the other of the two power-shift elements is connected on the output side to the hollow transmission shaft. Therefore, a speed of rotation of the drive assembly can be transferred either to the central transmission shaft or to the hollow transmission shaft via selective engagement of the power-shift elements. The central transmission shaft and the hollow transmission shaft can be connected to the countershaft in order to implement a transmission ratio via gear stages that can be engaged into and disengaged from the power flow via shift devices. In addition, at least two gear stages are assigned to each of a plurality of shift devices.

According to the invention, at least nine transmission ratios for forward travel can be implemented in a manner that is favorable in terms of construction space by means of engaging and disengaging the gear stages.

If at least three transmission ratios can be implemented by engaging three gear stages in each case on the shift-element side into the power flow, thereby enabling one transmission ratio to be at least partially implemented in each case by the respective sole engagement into the power flow on the shift-element side, then, in an advantageous embodiment of the double clutch transmission according to the invention, gear stages for implementing various transmission ratios are used multiple times, thereby resulting in a double clutch transmission that requires little construction space.

Further embodiments of the double clutch transmission according to the invention that are favorable in terms of construction space are designed with five shift devices, via each of which at least two gear stages can be engaged into the power flow, and/or comprise eight gear-set planes, each of which features spur-gear stages having discrete transmission ratios.

The features mentioned in the following example embodiments of the double clutch transmission according to the invention are suitable for developing the subject matter of the invention by themselves or in any combination with each other. The combinations of a given set of features do not limit the development of the subject matter of the invention and are merely substantially representative in nature.

Additional advantages and advantageous embodiments of the double clutch transmission according to the invention are set forth in the example embodiments, the principle of which is described with reference to the drawings; for the sake of clarity, the same reference characters are used for components having the same design and function in the description of the different example embodiments.

DETAILED DESCRIPTION OF THE PREFERRED EMBODIMENTS

Figure 1:
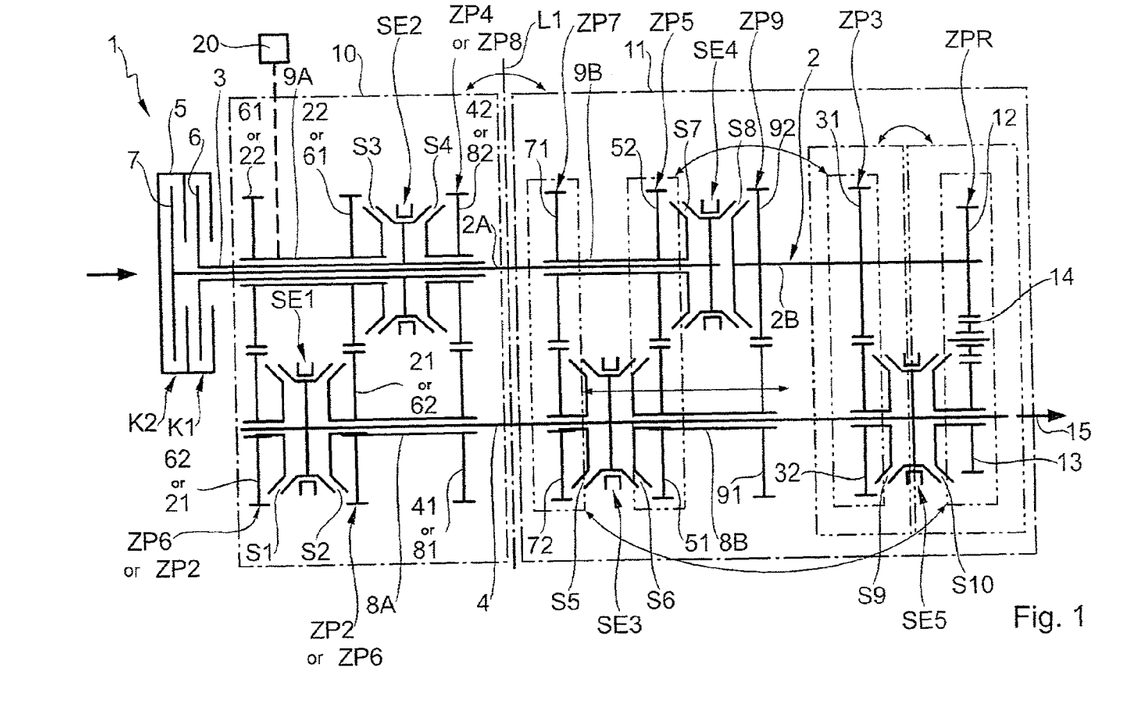
FIG. 1 a gear pattern of two alternative embodiments of the double clutch transmission according to the invention.

FIG. 1 shows two alternative example embodiments of a double clutch transmission 1 having a countershaft design; the example embodiments basically have the same design, and so the design of the double clutch transmission 1 will be described first by reference to the first embodiment, and then the differences between the two embodiments will be discussed in greater detail.

The double clutch transmission 1 comprises 17 gearwheels, one central transmission shaft 2 and a hollow transmission shaft disposed concentrically thereto, exactly one countershaft 4, and two power-shift elements K1, K2, which are embodied as friction-locking multi-disk clutches in the present case. The two power-shift elements K1 and K2 are the start-up elements of the double clutch transmission. In the installed state of the double clutch transmission, input elements, which are labeled "5", of the power-shift elements K1, K2 are connected or operatively connected to a drive assembly, which is not shown in greater detail in the drawing, of an internal combustion engine of a vehicle drive train, for example. An output element, which is labeled "6", of the power-shift element K1 is connected to the hollow transmission shaft 3, while an output element, which is labeled "7", of the power-shift element K2 is coupled in a rotationally fixed manner to the central transmission shaft 2. The structural embodiment of the two power-shift elements K1, K2 depicted in the drawing is intended to be an example and is at the discretion of a person skilled in the art. Therefore, the two driven input elements 5 of the power-shift elements K1, K2 are designed in this case, as an example, as a shared outer disk carrier for both power-shift elements K1, K2, and the two output elements 6, 7 of the power-shift elements K1, K2 are each correspondingly designed as inner disk carriers.

In the present case, the central transmission shaft 2 has a divided design, wherein a first transmission subshaft 2A of the central transmission shaft 2 can be connected to a second transmission subshaft 2B of the central transmission shaft via one shift device SE4 of a total of five shift devices SE1 to SE5 of the double clutch transmission. The first transmission subshaft 2A is connected to the second shift-element half 6 of the first power-shift element K1.

The central transmission shaft 2 or the transmission subshafts 2A, 2B thereof, and the hollow transmission shaft 3, can be connected to the countershaft 4 in order to implement nine transmission ratios "1" to "9" for forward travel and one transmission ratio "R" for travel in reverse, the transmission ratios being described in greater detail with reference to FIG. 2, via exactly eight gear stages ZP2, ZP3, ZP4, ZP5, ZP6, ZP7, ZP9 and ZPR, which can be engaged into and disengaged from the power flow of the double clutch transmission via exactly five shift devices SE1 to SE5. The eight gear stages ZP2 to ZPR form exactly eight gear stage planes, which are disposed next to one another in the axial direction. At least two gear stages ZP6 and ZP2, ZP2 and ZP4, ZP7 and ZP5, ZP5 and ZP9, as well as ZP3 and ZPR are assigned to the five shift devices SE1 to SE5, respectively.

In the present case, the shift devices SE1 to SE5 are embodied as so-called double synchronizations and comprise two shift elements S1 and S2, S3 and S4, S5 and S6, S7 and S8, S9 and S10, respectively, via which at least one of the gear stages ZP2 to ZPR can be coupled to the central transmission shaft 2 or the first transmission subshaft 2A thereof, to the hollow transmission shaft 3, or to the countershaft 4, and in the region of which rotational speed differentials can be compensated for or reduced to a certain extent.

A hollow shaft 8A is provided on the countershaft 4, being disposed coaxially thereto, which can be connected in a rotationally fixed manner via the shift element S2 of the shift device SE1 to the countershaft 4, and to which, in the present case, a gearwheel 21 of the gear stage ZP2 and a gearwheel 41 of the gear stage ZP4, with which a gearwheel 42 disposed on the hollow transmission shaft 3 meshes, are connected in a rotationally fixed manner. Furthermore, in the present case, another hollow shaft 9A is provided, which is disposed on the hollow transmission shaft 3 coaxially thereto, and which can be connected in a rotationally fixed manner via the shift element S3 of the shift device SE2 to the hollow transmission shaft 3, and to which another gearwheel 22 of the gear stage ZP2 and a gearwheel 61 of the gear stage ZP6, which is engaged with a gearwheel 62 designed as an idler gear and rotatably disposed on the countershaft 4, are connected in a rotationally fixed manner.

Alternatively to the above-described embodiment of the double clutch transmission 1 comprising five shift devices SE1 to SE5, each of which has two shift elements S1 and S2, S3 and S4, S5 and S6, S7 and S8, S9 and S10, respectively, it is also possible to design one or more of the shift devices SE1 to SE5 as separate shift devices, in which case more than five actuators must be provided in order to actuate the individual shift elements S1 to S10.

In addition, a second hollow shaft 8B is provided on the countershaft 4, being disposed coaxially thereto, which can be connected to the countershaft 4 in a rotationally fixed manner via the shift device SE3 or the shift element S6 thereof, and to which a gearwheel 51 of the gear stage ZP5 and a gearwheel 91 of the gear stage ZP9 are coupled in a rotationally fixed manner in the present case.

Moreover, another hollow shaft 9B is rotatably disposed on the first transmission subshaft 2A of the central transmission shaft 2, wherein the hollow shaft can be coupled in a rotationally fixed manner to the first transmission subshaft 2A via the shift element S7 of the shift device SE4, and to which a gearwheel 71 of the gear stage ZP7, which is engaged with a gearwheel 72 that is designed as an idler gear and is rotatably disposed on the countershaft 4, and another gearwheel 52 of the gear stage ZP5 are connected in a rotationally fixed manner.

By means of the two power-shift elements K1 and K2, a torque of a drive assembly present in the region of the input elements 5 can be selectively transferred to the first transmission subshaft 2A of the central transmission shaft 2 or to the hollow transmission shaft 3. In order to implement the various transmission ratios "1" to "R", the gear stages ZP2 to ZPR are engaged into or disengaged from the power flow of the double clutch transmission 1 via the shift devices SE1 to SE5 or the shift elements S1 to S10 thereof in the manner described in greater detail in the following.

In order to change a transmission ratio without interruption of tractive force in the region of the two power-shift elements K1 and K2, the target transmission ratio to be implemented at the moment is preselected in the region of a subtransmission 10 or 11, which is presently in the load-free operating state, by disengaging and engaging the applicable shift elements S1 to S10 accordingly and then transferring the currently engaged power-shift element K1 or K2 to a disengaged operating state, while the currently disengaged power-shift element K2 or K1 is transferred to the engaged operating state thereof during an overlapping shift.

The transmission ratios "2" to "7" and the transmission ratio "9" for forward travel can be implemented in the double clutch transmission 1 by the sole engagement, on the shift-element side, of the gear pairings ZP2, ZP3, ZP4, ZP5, ZP6, ZP7 or ZP9, respectively The first transmission ratio "1" for forward travel can be implemented by simultaneously engaging the three gear stages ZP5, ZP9 and ZP3 on the shift-element side into the power flow of the double clutch transmission 1, and is therefore a so-called winding path gear. Furthermore, the eighth transmission ratio "8" for forward travel is implemented by simultaneously engaging the three shift stages ZP4, ZP2 and ZP6 on the shift-element side in the double clutch transmission 1, while the transmission ratio "R" for travel in reverse is implemented by simultaneously engaging the three gear stages ZP5, ZP9 and ZPR on the shift-element side in the double clutch transmission 1. Therefore, the eighth transmission ratio "8" for forward travel and the transmission ratio "R" for travel in reverse are so-called winding path gears.

The two gear stages ZP5 and ZP9 are engaged into the power flow in order to implement the two transmission ratios "1" and "R", respectively, while the gear stage ZP3 or the gear stage ZPR are additionally engaged in order to implement the transmission ratios "1" and "R", respectively.

The four gear stages ZP6, ZP7, ZP3 and ZPR can be operatively connected to the countershaft 4 via the shift element S1, S5, S9 or S10, respectively. In addition, the gear stages ZP6 and ZP2, via which the sixth transmission ratio "6" or the second transmission ratio "2" for forward travel can be implemented, can be coupled to the hollow transmission shaft 3 via the shift element S3 in the present case.

In addition to the two gearwheels 61 and 22, which are connected in a rotationally fixed manner to the hollow shaft 9A in the present case, the further gearwheel 42 of the gear stage ZP4 can be operatively connected in a rotationally fixed manner to the hollow transmission shaft 3 via the shift element S4 of the shift device SE2. In addition to the two gearwheels 71 and 52 of the gear stages ZP7 and ZP5, which are connected in a rotationally fixed manner to the further hollow shaft 9B, it is also possible to couple a gearwheel 92 of the gear stage ZP9, a gearwheel 31 of the gear stage ZP3, and a gearwheel 12 of the gear stage ZPR, each of which is connected in a rotationally fixed manner to the second transmission subshaft 2B of the central transmission shaft 2, to the first transmission subshaft 2A in a rotationally fixed manner via the shift element S8 of the shift device SE4. Another gearwheel 13 of the gear stage ZPR can be connected in a rotationally fixed manner to the countershaft 4 via the shift element S10 of the shift device SE5, wherein the two gearwheels 12 and 13 of the gear stage ZPR are each engaged with an intermediate gear 14, thereby making it possible to change the direction of rotation in the double clutch transmission 1 in the region of the gear stage ZPR, which is required in order to operate the vehicle in reverse.

In addition, a gearwheel 32 of the gear stage ZP3, which is designed as an idler gear, can be operatively connected in a rotationally fixed manner to the countershaft 4 via the shift element S9 of the shift device SE5. The further gearwheel 72 of the gear stage ZP7 is also connected in a rotationally fixed manner to the countershaft 4 in the engaged operating state of the shift element S7 of the shift device SE3.

Figure 2:
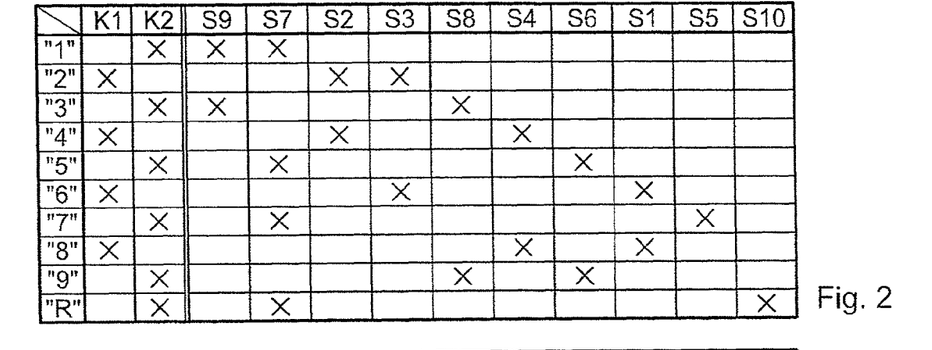
FIG. 2 a shift matrix of a first embodiment of the double clutch transmission according to FIG. 1.

The shift elements S1 to S10 of the shift devices SE1 to SE5 are actuated according to the shift logic, which is depicted in greater detail in FIG. 2, in order to implement the transmission ratios "1" to "9" for forward travel, and to implement the transmission ratio "R" for travel in reverse, wherein each of the shift elements 51 to S10 is engaged or held in the engaged operating state in order to implement one of the transmission ratios "1" to "R", the cells of which are filled with the letter "X", while the other shift elements S1 to S10, the cells of which are blank, are transferred to the disengaged operating state thereof or are retained in the disengaged operating state. At the same time, the power-shift element K1 or K2, which is marked by the letter "X", is transferred to the engaged operating state, while the other power-shift element K2 or K1, the cell of which is blank, is disengaged.

In the aforementioned second embodiment of the double clutch transmission 1 according to FIG. 1, the two gear stages ZP2 and ZP6 are reversed in the axial extension of the central transmission shaft 2 relative to the above-described configuration in which the gear stage ZP6 is disposed between the gear stage ZP2 and the two power-shift elements K1, K2, and so the gear stage ZP2 is positioned between the gear stage ZP6 and the power-shift elements K1 and K2.

Figure 3:
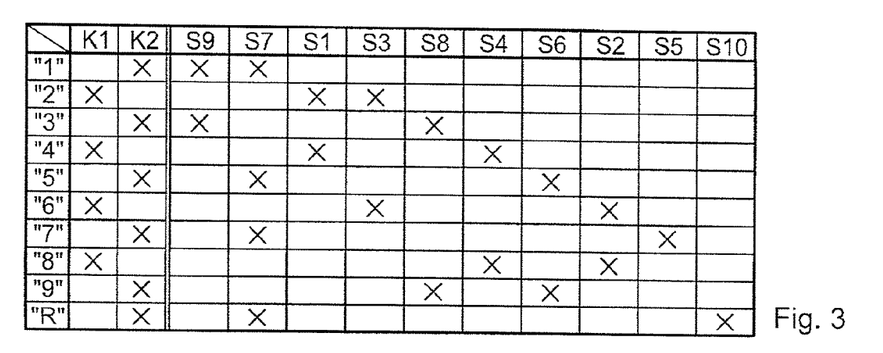
FIG. 3 a shift matrix of a second embodiment of the double clutch transmission according to FIG. 1.

In the second embodiment of the double clutch transmission 1 according to FIG. 1, the shift elements S1 to S10 are actuated in a manner analogous to the shift logic depicted in greater detail in FIG. 3 in order to implement the transmission ratios "1" to "9" for forward travel and to implement the transmission ratio "R" for travel in reverse. Due to the reversed configuration of the gear stages ZP2 and ZP6, instead of the transmission ratio step "8", the transmission ratio step "4", in addition to the two other transmission ratios "1" and "R", is embodied as a winding path gear, and the transmission ratio step ZP4 of the first embodiment is replaced by the transmission ratio step ZP8, which is then engaged solely into the power flow of the double clutch transmission 1 in order to implement the eighth transmission ratio "8".

The two gear set variants of the double clutch transmission 1 depicted in FIG. 1 can be changed while retaining the same function via a different positioning of the gear stages ZP2 to ZPR with respect to one another, and of the shift devices SE1 to SE5 and the shift elements S1 to S10 thereof, as described in greater detail in the following, wherein the shift elements S1 to S10, which are preferably designed as synchronizations, are fixedly assigned to the gear stages ZP2 to ZPR according to the tables shown in FIG. 4, which relates to the first embodiment of the double clutch transmission 1 according to FIG. 1, and in FIG. 5, which relates to the second embodiment of the double clutch transmission 1 according to FIG. 1. Due to this fixed assignment, the particular shift matrix shown in FIG. 2 and FIG. 3 does not change if the gear stages ZP2 to ZPR, which are designed as spur-gear stages in the present case, are positioned in a manner that differs from the configuration of gear stages ZP2 to ZPR depicted in FIG. 1.

Figure 4:
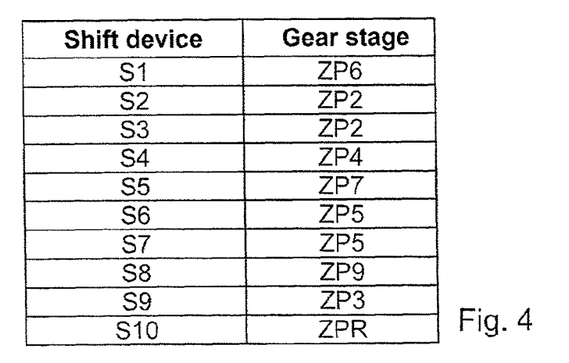
FIG. 4 an overview, in table form, of the assignment between the shift elements of the shift devices and the gear stages of a first embodiment of the double clutch transmission according to FIG. 1.
Figure 5:
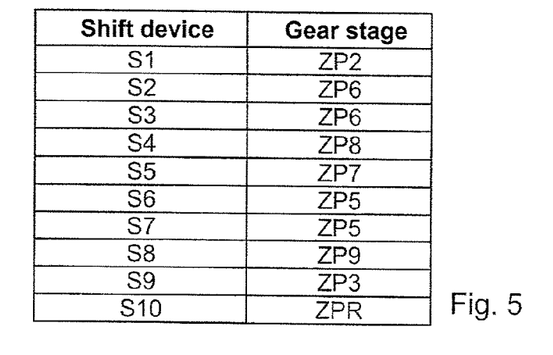
FIG. 5 an overview, in table form, of the assignment between the shift elements of the shift devices and the gear stages of the second embodiment of the double clutch transmission according to FIG. 1.

According to the assignment shown in FIG. 4, the shift element S1 is assigned to gear stage ZP6, the shift element S2 is assigned to gear stage ZP2, the shift element S3 is assigned to gear stage ZP2, the shift element S4 is assigned to gear stage ZP4, the shift element S5 is assigned to gear stage ZP7, the shift element S6 is assigned to gear stage ZP5, the shift element S7 is assigned to gear stage ZP5, the shift element S8 is assigned to gear stage ZP9, the shift element S9 is assigned to gear stage ZP3 and the shift element S10 is assigned to gear stage ZPR.

In deviating therefrom, in the second gear set variant of the double clutch transmission 1 according to FIG. 1, in which the gear stages ZP2 and ZP6 are disposed in a reversed configuration compared to the first gear set variant, the shift elements S1 to S10 are assigned to the gear stages ZP2 to ZPR as follows. The shift element S1 is assigned to the gear stage ZP2, the shift element S2 is assigned to the gear stage ZP6, the shift element S3 is assigned to the gear stage ZP6, the shift element S4 is assigned to the gear stage ZP8, the shift element S5 is assigned to the gear stage ZP7, the shift element S6 is assigned to the gear stage ZP5, the shift element S7 is assigned to the gear stage ZP5, the shift element S8 is assigned to the gear stage ZP9, the shift element S9 is assigned to the gear stage ZP3, and the shift element S10 is assigned to the gear stage ZPR.

In the first gear set variant and in the second gear set variant of the double clutch transmission 1 according to FIG. 1, the gear stages ZP2 and ZP6, and the gear stage ZP4 or the gear stage ZP8 are assigned to the first subtransmission 10 and are disposed between the power-shift elements K1 and K2 and the gear stages ZP7, ZP5, ZP9, ZP3 and ZPR, which are assigned to the second subtransmission 11. In an embodiment of the double clutch transmission 1 that deviates therefrom, the gear stages ZP7, ZP5, ZP9, ZP3 and ZPR of the second subtransmission 11 are disposed between the power-shift elements K1 and K2 and the gear stages ZP2, ZP6 and ZP4 or ZP8 of the first subtransmission, wherein, in the variant embodiment that deviates from FIG. 1, the two subtransmissions 10 and 11 are reversed by reflecting the double clutch transmission 1 along a line L1 shown in greater detail in FIG. 1.

Alternatively to the latter-described variant embodiment of the gear stages ZP2 to ZPR or, cumulatively therewith, the gear stages ZP2, ZP3, ZP4 or ZP8, ZP5, ZP6, ZP7 and ZPR can exchange positions with one another or can be disposed at various axial positions in the double clutch transmission 1 in the axial extension of the main central transmission shaft 2 of the double clutch transmission 1 in the manner described in greater detail by reference to FIG. 1 and FIG. 6 and FIG. 7, without changing the functionality of the double clutch transmission 1, which is described in greater detail by reference to FIG. 1. In addition, in deviating from the variant embodiment shown in FIG. 1, the gear stages ZP3 and ZPR can be disposed in a manner reflected along a line L2 shown in greater detail in FIG. 7, thereby making it possible to engage the gear stages ZP3 and ZPR by coupling the gear stages ZP3 and ZPR to the countershaft 4, the central transmission shaft 2, or the hollow transmission shaft 3, depending on the particular variant embodiment.

The gear stages ZP3 and ZPR can be engaged into the power flow via the shared shift device SE5, wherein the gear stage ZP3 is disposed, in the axial extension of the central transmission shaft 2 and relative to the assigned shift device SE5, on a side of the shift device SE5 facing the power-shift elements K1 and K2, and the gear stage ZPR is disposed on a side of the shift device SE5 facing away from the power-shift elements K1 and K2.

Alternatively, the gear stage ZPR can be disposed on the side of the shift device SE5 facing the power-shift elements K1 and K2, and the gear stage ZP3 can be disposed on the side of the shift device SE5 facing away from the power-shift elements K1 and K2.

In deviating from the embodiment of the double clutch transmission 1 depicted in the drawing, in which the hollow shaft 9B is disposed on the central transmission shaft 2 or the first transmission subshaft 2A, it is also possible to design the double clutch transmission 1 without the hollow shaft 9B, in which case the gearwheel 71 of gear stage ZP7 is designed as a fixed gear and is connected in a rotationally fixed manner to the central transmission shaft 2 or the first transmission subshaft 2A. The gearwheel 52 of the gear stage ZP5 is furthermore disposed as an idler gear on the central transmission shaft 2 or the first transmission subshaft 2A and can be coupled in a rotationally fixed manner to the first transmission subshaft 2A via the shift element S7.

Figure 6:
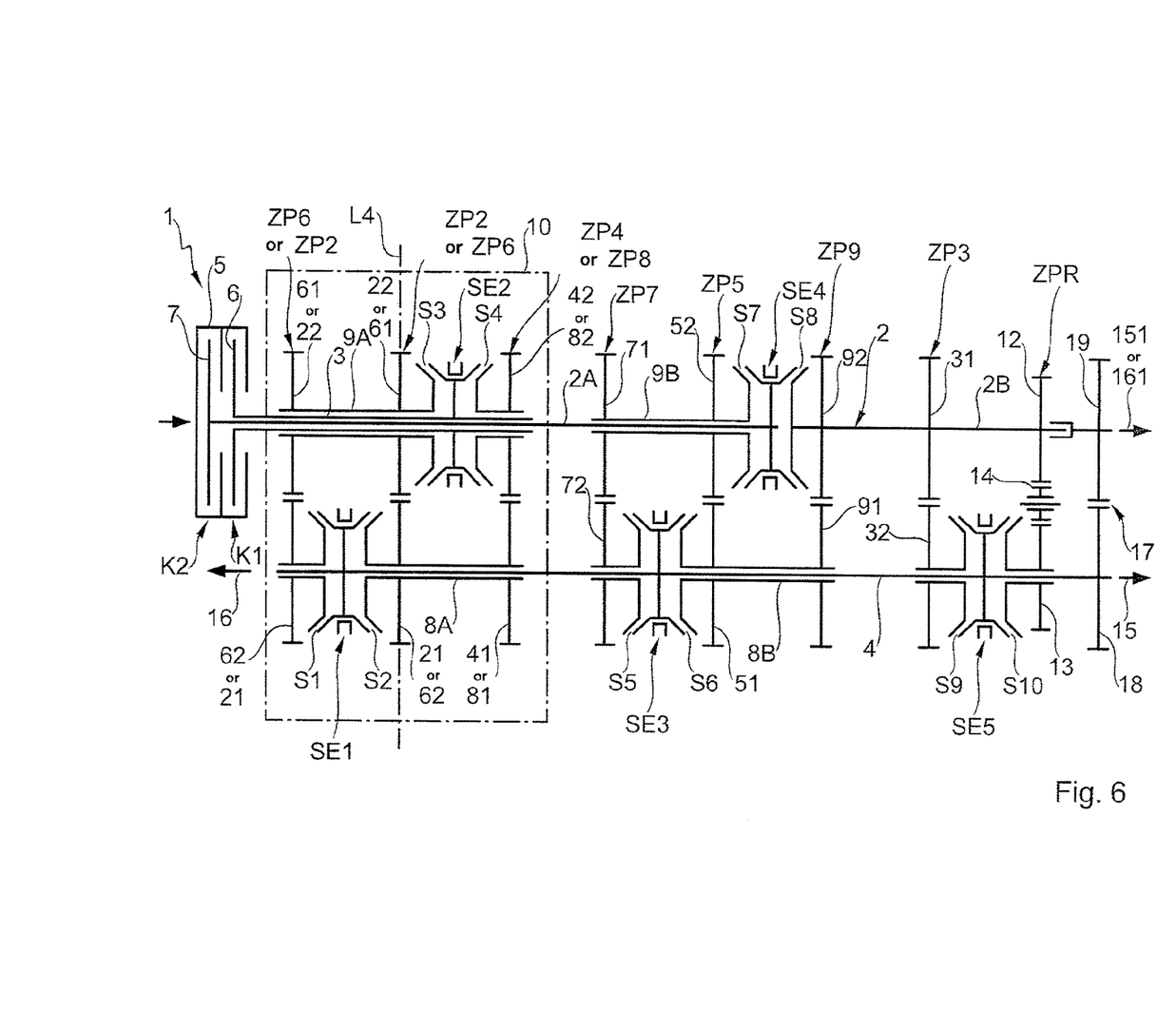
FIG. 6 a representation of another embodiment of the double clutch transmission according to the invention, which corresponds to FIG. 1.
Figure 7:
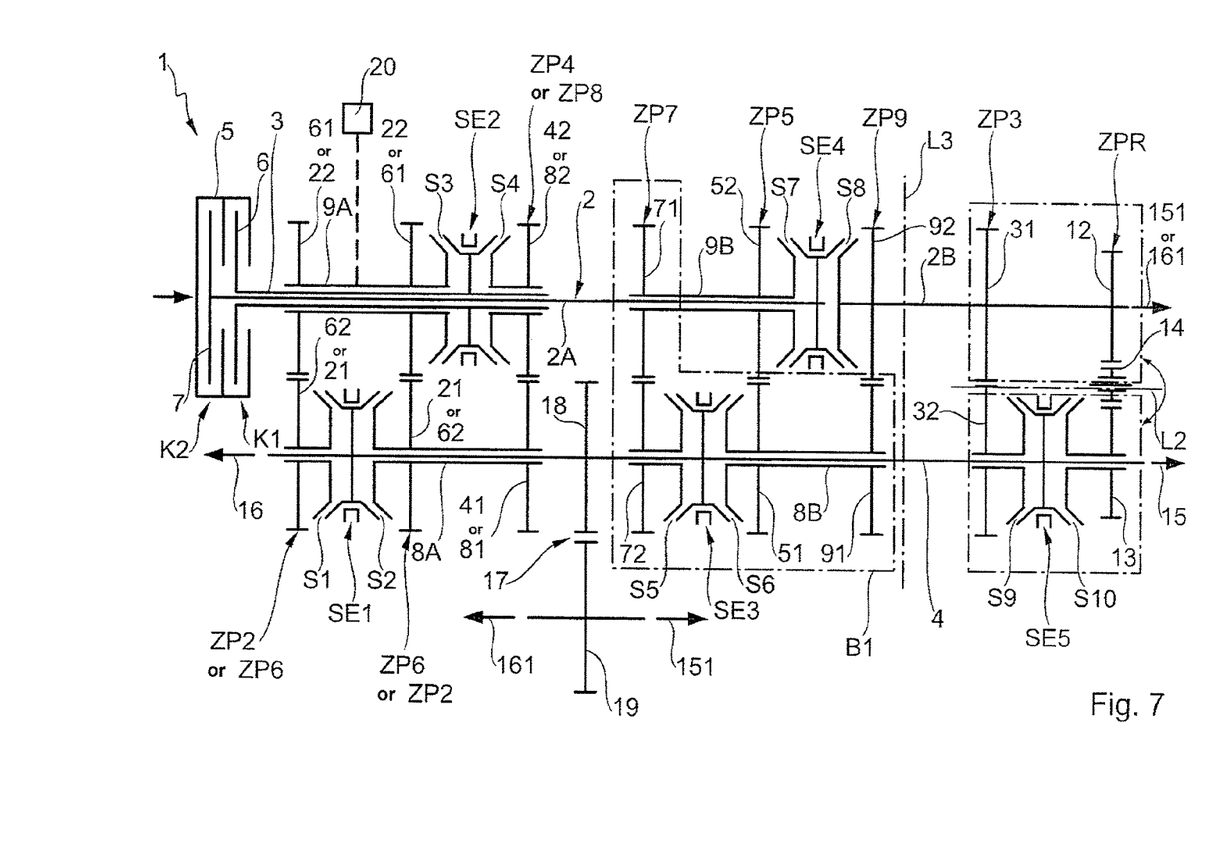
FIG. 7 another embodiment of the double clutch transmission according to the invention, in a representation corresponding to FIG. 1.

The gear stage ZP7 is provided between the gear stage ZP5 and the power-shift elements K1 and K2 in the manner depicted in FIG. 1, FIG. 6, and FIG. 7, wherein the gear stage ZP5 is positioned in the axial extension of the central transmission shaft 2 on the side of the shift device SE4 facing the power-shift elements K1 and K2.

If the gearwheel 71 of the gear stage ZP7 is designed as a fixed gear and the double clutch transmission 1 is designed without the hollow shaft 9B, it is possible to dispose the gear stage ZP3, which is disposed in the middle between the gear stages ZP9 and ZPR relative to the axial extension of the central transmission shaft 2, at the position of the gear stage ZP5, in which case the gear stage ZP5 is disposed at the position of the central gear stage ZP3.

In turn, as an alternative or cumulatively therewith, the outer gear stage ZPR, which is disposed on the side of the central gear stage ZP3 facing away from the power-shift elements K1 and K2 relative to the axial extension of the central transmission shaft 2, can be disposed at the position of the gear stage ZP7, while the gear stage ZP7 is then provided at the position of the outer gear stage ZPR. The latter-described reversal of the gear stages ZP7 and ZPR can only be implemented when the gearwheel 71 of the gear stage ZP7 is disposed as a fixed gear on the central transmission shaft 2 or the first transmission subshaft 2A and the double clutch transmission 1 is designed without the hollow shaft 9B.

In turn, as an alternative to the above-described positioning of the gear stages ZP2 to ZPR of the double clutch transmission 1, or cumulatively therewith, it is also possible to dispose the gear stage ZP7 between the central gear stage ZP3 and the outer gear stage ZP9, which is disposed on the side of the gear stage ZP3 facing the power-shift elements K1 and K2 in the axial extension of the central transmission shaft 2, wherein this configuration substantially corresponds to a mirror image of the region B1, which is shown in greater detail in FIG. 7, along a line L3, which is shown in greater detail in FIG. 7. By reflecting the region B1 about the line L3, the shift device SE3 is also moved from the position between the gear stages ZP9 and ZP7 depicted in FIG. 7 and is then disposed on the side of the gear stage ZP9 facing away from the power-shift elements K1 and K2.

In turn, as an alternative to or cumulatively with respect to the above-described variant embodiments of the gear stages ZP2 to ZPR of the double clutch transmission 1, it is also possible to reflect the subtransmission 2A at another line L4 shown in FIG. 6, in which case the gear stage ZP4 or ZP8 is disposed between the power-shift elements K1 and K2 and the gear stages ZP2 and ZP6, while the shift device SE2 is provided on the side of the gear stage ZP2 or ZP6 facing the power-shift elements K1 and K2, and the shift device SE1 is disposed in the axial extension of the central transmission shaft 2 on the side of the power-shift elements K1 and K2 facing away from the gear stage ZP2 or ZP6.

Combining the various above-described variant embodiments of the gear stages ZP2 to ZPR with one another results in 128 functionally identical variants of the double clutch transmission 1.

Depending on the variant embodiment of the gear stages ZP2 to ZPR of the double clutch transmission 1 that is implemented, the hollow shaft 9A is disposed either directly on the central transmission shaft 2 or on the hollow transmission shaft 3, as shown in the drawing. Furthermore, the hollow shaft 9B is provided either on the central transmission shaft 2 or on the hollow transmission shaft 6, depending on the variant embodiment of the gear stages ZP2 to ZPR that is implemented.

The gear stages ZP6, ZP2 and ZP4 or ZP8 can be coupled to the central transmission shaft 2 or the hollow transmission shaft 3, and to the countershaft 4 via the shift elements S1 to S4 of the shift devices SE1 and SE2, depending on which variant embodiment of the gear stages ZP2 to ZPR of the double clutch transmission 1 is selected.

Furthermore, depending on which variant embodiment of the gear stages ZP2 to ZPR is selected, the gear stages ZP7, ZP5, ZP9, ZP3 and ZPR are assigned either to the central transmission shaft 2, to the two transmission subshafts 2A and 2B, or to the hollow transmission shaft 3.

If the two subtransmissions 10 and 11 are reversed with respect to the configuration shown in FIG. 1, i.e. if the subtransmission 11 is located between the power-shift elements K1 and K2 and the subtransmission 10, the hollow transmission shaft has a sectional design and a first transmission subshaft of the hollow transmission shaft can be coupled to a second transmission subshaft of the hollow transmission shaft via the shift device SE4, and one of the transmission subshafts is connected to one of the output sides of the power-shift elements. In addition, the three gear stages ZP9, ZP3 and ZPR are then coupled in a rotationally fixed manner to one transmission subshaft of the hollow transmission shaft, and the gear stage ZP7 can be coupled together with the gear stage ZP5 via the shift device SE4 to the other transmission subshaft, or the gear stage ZP7 is connected in a rotationally fixed manner in the region of the gearwheel 71 thereof, which is designed as a fixed gear, to the transmission subshaft of the hollow transmission shaft.

Alternatively to the sectional design of the central transmission shaft 2 or the hollow transmission shaft 3, it is also possible to design the central transmission shaft or the hollow transmission shaft to be continuous and to dispose another hollow shaft on the central transmission shaft or the hollow transmission shaft such that the hollow shaft can be coupled to the central transmission shaft or the hollow transmission shaft via the shift device SE4, wherein the three gear stages ZP9, ZP3 and ZPR are connected in a rotationally fixed manner to the hollow shaft, while the gear stage ZP7 can be connected to the central transmission shaft 2 or the hollow transmission shaft 3 via the shift element S7 of the shift device SE4. In an embodiment of the double clutch transmission 1 without the hollow shaft 9B, the gear stage ZP7 is connected in a rotationally fixed manner via the fixed gear 71 to the central transmission shaft 2 or the hollow transmission shaft 3, while the gear stage ZP5 can be coupled via the shift device SE4 or the shift element S7 thereof to the central transmission shaft 2 or the hollow transmission shaft 3.

In turn, depending on the variant embodiment of the gear stages ZP2 to ZPR that is implemented, the gear stage ZP6 or the gear stage ZP2 can be coupled via the shift element S3 of the shift device SE2 to the central transmission shaft 2 or the hollow transmission shaft 3, and via the shift device SE1, to the countershaft 4.

In the example embodiment of the double clutch transmission 1 depicted in FIG. 1, an output drive 15 of the double clutch transmission 1 is provided coaxially to the countershaft 4, and the double clutch transmission 1 is designed with only one transmission output. The output drive 15 of the double clutch transmission can be coupled to at least one drivable vehicle axis via appropriate devices.

If the double clutch transmission 1 according to FIG. 1 is part of an all-wheel vehicle drive train, a power divider device should be connected downstream of the double clutch transmission 1, via which the torque transmitted from the double clutch transmission 1 in the region of the gear stage ZPR via the output element 15 can be distributed between a plurality of drivable vehicle axes.

Alternatively thereto, it is also possible to transfer the torque present at the countershaft 4 from the double clutch transmission 1, according to the manner depicted in FIG. 6 and FIG. 7, via the output drive 15 in the region of the gear stage ZPR and, additionally, via another output drive 16 in the region of the gear stage ZP6 or ZP2, wherein the output drive 15 and the further output drive 16 are disposed coaxially to the countershaft 4.

Alternatively to the coaxial arrangement of the output drives 15 and 16 with respect to the countershaft 4, it is also possible to route the output drive 15 and/or the further output drive 16 out of the double clutch transmission 1 in the manner shown in addition in FIG. 6 and FIG. 7 with axle offset with respect to the countershaft 4 and/or to the central transmission shaft 2, wherein the axle-offset variant of the output drive or the further output drive is indicated in greater detail by reference character 151 or 161, respectively.

The axle offset is implemented in a structurally simple manner via an additional output drive constant gear pairing 17, wherein a gearwheel 18 of the output drive-constant gear pairing 17, which is designed as a fixed gear, is connected in a rotationally fixed manner to the countershaft 4 in the manner depicted in FIG. 6 and FIG. 7. The gearwheel 18 meshes with a gearwheel 19 of the output drive constant gear pairing 17, which is connected to the output drive 151 and/or the output drive 161.

In an example embodiment of the double clutch transmission 1 shown in FIG. 6, the output drive-constant gear pairing 17 is provided on the side of the gear stage ZPR facing away from the gear stage ZP3 in axial extension of the central transmission shaft 2, wherein the gearwheel 19 is disposed coaxially with respect to the main transmission shaft 2 and is rotatably supported thereon.

In an example embodiment of the double clutch transmission 1 shown in FIG. 7, the gearwheel 18 of the output drive-constant gear pairing 17 is disposed, from a spatial perspective, axially between the gear stage ZP4 or ZP8 and the gear stage ZP7.

If one of the gearwheels of the gear stages ZP2 to ZPR assigned to the countershaft 4 is designed as a fixed gear, it is also possible to bring the gearwheel 19 of the output drive-constant gear pairing into gear engagement with this fixed gear and to implement the axle offset between the output drive 151 and the further output drive 161 in a manner that is favorable in terms of structural space.

The double clutch transmission 1 is also designed with at least one electric machine 20 in the manner depicted in FIG. 1 and FIG. 7. The electric machine 20 can be mechanically engaged into the power flow of the double clutch transmission. To this end, the electric machine 20 should be connected to one of the shafts of the gear set of the double clutch transmission 1. It is thereby possible to provide an operative connection between the electric machine 20 and the double clutch transmission 1 in the region of the fixed gear or an idler gear of the gear set of the double clutch transmission 1, or to connect the electric machine 20 in the region of an additional fixed gear to the gear set.

An advantageous operative connection between the electric machine 20 and the power flow of the double clutch transmission 1 is present when the operative connection between the electric machine 20 and the power-shift elements K1 and K2 and between the electric machine 20 and the output drive 15 or 16, or 151 or 161 can be shifted depending on the particular current operating state of the vehicle drive train and the electric machine, since it is then possible to implement various hybrid functions, such as a charging procedure of an electric accumulator assigned to the electric machine 20 while the vehicle is at a standstill, or a purely electric driving mode, which is implemented while the electric machine 20 is operated as a motor.

The double clutch transmission 1 according to the invention is designed, in the present case, with five coupling devices disposed in a group, and five shift devices SE1 to SE5, which can be actuated using only five actuators. Furthermore, the double clutch transmission 1 is designed in a manner that is favorable in terms of construction space having only eight gear planes for implementing at least nine transmission ratios "1" to "9" for forward travel and one transmission ratio "R" for travel in reverse.

Advantageously, one transmission ratio change proceeding from the first transmission ratio "1" for forward travel, which is currently selected in the double clutch transmission 1, can be carried out in the direction of all even transmission ratios "2", "4", "6" and "8" without interruption of tractive force or in a power-shiftable manner. Furthermore, transmission ratio changes in the double clutch transmission 1 proceeding from all even transmission ratios "2", "4", "6" and "8" can be carried out in the direction of all uneven transmission ratios "1", "3", "5", "7" and "9", and in the reverse direction, also in a power-shiftable manner or without interruption of tractive force. This also applies for transmission ratio changes across a plurality of transmission ratio steps.

Any impairment of the overall efficiency of the double clutch transmission 1 during the implementation of the winding path gears "1" and "R" due to the simultaneous engagement of three gear stages ZP5, ZP9 and ZP3 and ZP5, ZP9 and ZPR, respectively, into the power flow is negligible since these transmission ratios make up substantially smaller portions of driving in the course of the service life and the entire usage cycle compared to the other transmission ratios of the double clutch transmission 1. This also applies if the output drive 15 and/or 16 is connected to the countershaft 4 via the additional output drive-constant gear pairing 17.

REFERENCE CHARACTERS 1 double clutch transmission
2 central transmission shaft
2A, 2B transmission subshaft
3 hollow transmission shaft
4 countershaft
5 input element of the power-shift elements
6 output element of a power-shift element
7 output element of a power-shift element
8A, 8B hollow shaft
9A, 9B hollow shaft
10 first subtransmission
11 second subtransmission
12 gearwheel
13 gearwheel
14 intermediate gear
15, 151 output drive
16, 161 further output drive
17 output drive constant gear pairing
18 gearwheel
19 gearwheel
20 electric machine
21, 22 gearwheel
31, 32 gearwheel
42, 42 gearwheel
51, 52 gearwheel
61 62 gearwheel
71, 72 gearwheel
81, 82 gearwheel
91, 92 gearwheel
L1, L2, L3, L4 line
K1, K2 power-shift element
SE1 to SE5 shift device
S1 to S10 shift element
ZP2 to ZPR gear stage
"1" to "9" transmission ratio for forward driving
"R" transmission ratio for travel in reverse

The invention claimed is:

1. A double clutch transmission (1) having a countershaft design, the double clutch transmission comprising:
a central transmission shaft (2) and a hollow transmission shaft (3) disposed concentrically thereto, exactly one countershaft (4), and first and second power-shift elements (K1, K2);
both of the first and the second power-shift elements (K1, K2) being operatively connectable, on a drive side thereof, with a drive assembly;
one of the first and the second power-shift elements (K2) being connected, on an output side thereof, to the central transmission shaft (2);
the other of the first and the second power-shift elements (K1) being connected to the hollow transmission shaft (3);
the central transmission shaft (2) and the hollow transmission shaft (3) being connectable to the countershaft (4) to implement a transmission ratio ("1") via gear stages (ZP2 to ZPR), which are engagable into and disengageable from a power flow, by a plurality of shift devices (SE1 to SE5);
at least two of the gear stages ((ZP6, ZP2), (ZP2, ZP4), (ZP7, ZP5), (ZP5, ZP9), ZP3, ZPR); (ZP2, ZP6), (ZP6, ZP8), (ZP7, ZP5), (ZP5, ZP9), (ZP3, ZPR)) are assigned to the plurality of shift devices (SE1 to SE5), respectively;
first and second hollow shafts (8A, 8B) being provided on the countershaft (4) and being disposed coaxially to one another, each of the first and the second hollow shafts is coupleable, in a rotationally fixed manner, to the countershaft (4) via one of the plurality of shift devices (SE1 or SE3), and to which at least two gearwheels (21 or 61, 41 or 81, 51, 91) of the gear stages (ZP2 or ZP6, ZP4 or ZP8, ZP5, ZP9), respectively, are connected in a rotationally fixed manner;
a further hollow shaft (9A) being provided on either the central transmission shaft (2) or the hollow transmission shaft (3), and being disposed coaxially thereto, the further hollow shaft being connectable, via one of the plurality of shift devices (SE2), to either the central transmission shaft (2) or the hollow transmission shaft (3), and to which at least two further gearwheels (22, 61) of the gear stages (ZP2, ZP6) are connected in a rotationally fixed manner; and
at least three transmission ratios ("1", "8", "R"; "1", "4", "R") are implemented by selective engagement of three of the gear stages ((ZP5, ZP9, ZP3), (ZP4, ZP2, ZP6), (ZP5, ZP9, ZPR); (ZP5, ZP9, ZP3), (ZP8, ZP6, ZP2), (ZP5, ZP9, ZPR)), respectively, on a shift-element side into the power flow thereby enabling one transmission ratio ("2", "3", "4", "5", "6", "9"; "2", "3", "5", "6", "8", "9"), respectively, to be at least partially implemented by a respective sole engagement on the shift-element side into the power flow.

2. The double clutch transmission according to claim 1, wherein the central transmission shaft (2) or the hollow transmission shaft has a divided design, and a first transmission subshaft (2A) of the central transmission shaft (2) or the hollow transmission shaft is coupleable to a second transmission subshaft (2B) of the central transmission shaft (2) or the hollow transmission shaft via one of the plurality of shift devices (SE4), and one of the first and the second transmission subshafts (2A) of the two shift-element halves is connected to the output side of one of the first and the second power-shift elements (K1),
three of the gear stages (ZP9, ZP3, ZP6) are coupled to one of the first and the second transmission subshafts (2B), another of the gear stages (ZP7) is coupleable to or is connected to the other of the first and the second transmission subshafts (2A), via one of the plurality of shift devices (SE4), and an additional gear stage (ZP5) is coupleable, via the one of the plurality of shift devices (SE4), to the other of the first and the second transmission subshaft (2B).

3. The double clutch transmission according to claim 1, wherein the further hollow shaft supports three of the gear stages,
while another gear stage is connectable or is connected to the central transmission shaft or the hollow transmission shaft via one of the plurality of shift devices, and an additional gear stage is coupleable to the central transmission shaft or the hollow transmission shaft via one of the plurality of shift devices.

4. The double clutch transmission according to claim 2, wherein an additional hollow shaft (9B) is disposed on the central transmission shaft (2) or the hollow transmission shaft (3), the additional hollow shaft (9B) is coupleable thereto via one of the plurality of shift devices (SE4), and a gearwheel (71, 52) of the further gear stage (ZP7) and the additional gear stage (ZP5) are connected to the additional hollow shaft (9B) in a rotationally fixed manner.

5. The double clutch transmission according to claim 2, wherein the further gear stage (ZP7) is disposed between the first and the second power-shift elements (K1, K2) and the additional gear stage (ZP5).

6. The double clutch transmission according to claim 2, wherein one gear stage (ZP3), of the three gear stages (ZP9, ZP3, ZPR), is disposed in a middle between the two other gear stages (ZP9 and ZPR) relative to an axial extension of the central transmission shaft (2).

7. The double clutch transmission according to claim 6, wherein an outer gear stage (ZPR), of the three gear stages (ZP9, ZP3, ZPR) disposed on the side of the central gear stage (ZP3), faces away from the first and the second power-shift elements (K1, K2), relative to the axial extension of the central transmission shaft (2).

8. The double clutch transmission according to claim 6, wherein the further gear stage (ZP7) is disposed between the central gear stage (ZP3) of the three gear stages (ZP9, ZP3, ZPR) and an outer gear stage (ZP9) of the three gear stages (ZP9, ZP3, ZPR), is disposed on the side which faces the first and the second power-shift elements (K1, K2) in the axial extension of the central transmission shaft (2).

9. The double clutch transmission according to claim 1, wherein two of the three gear stages ((ZP5, ZP9, ZP3) or (ZP5, ZP9, ZPR)), which should be engaged into the power flow in order to implement two transmission ratios ("1", "R") are identical, and the third gear stage (ZP3 or ZPR) varies.

10. The double clutch transmission according to claim 1, wherein four of the gear stages (ZP6, ZP7, ZP3, ZPR; ZP2, ZP7, ZP3, ZPR) are operatively connected to the countershaft (4) by shift devices (SE1, SE3, SE5).

11. The double clutch transmission according to claim 1, wherein one of the gear stages (ZP6; ZP2), via which either a sixth or a second transmission ratio ("6", "2") for forward travel is implemented, is coupleable via one of the plurality of shift devices (SE2) to the central transmission shaft (2) or the hollow transmission shaft (3) and, via another of the plurality of shift devices (SE1), to the countershaft (4).

12. The double clutch transmission according to claim 1, wherein one gearwheel (61, 22, 42 or 82) of three of the gear stages (ZP6, ZP2, ZP4; ZP2, ZP6, ZP8) is coupleable, via one of the shift devices (SE2), to the central transmission shaft (2) or the hollow transmission shaft (3), and one gearwheel (71, 52, 92, 31, 12) of five further gear stages (ZP7, ZP5, ZP9, ZP3, ZPR) is coupleable, via another one of the plurality of shift devices (SE4), to the hollow transmission shaft (3) or the central transmission shaft (2).

13. The double clutch transmission according to claim 1, wherein a portion of the gear stages (ZP6, ZP2, ZP4; ZP2, ZP6, ZP8) is assigned to a first subtransmission (10) and a further portion of the gear stages (ZP7, ZP5, ZP9, ZP3, ZPR) is assigned to a second subtransmission (11),
the gear stages (ZP6, ZP2, ZP4; ZP2, ZP6, ZP8) assigned to the first subtransmission (10) are disposed between the gear stages (ZP7, ZP5, ZP9, ZP3, ZPR) of the second subtransmission (11) and the first and the second power-shift elements (K1, K2), or the gear stages (ZP7, ZP5, ZP9, ZP3, ZPR) of the second subtransmission (11) are disposed between the gear stages (ZP6, ZP2, ZP4; ZP2, ZP6, ZP8) of the first subtransmission (10) and the first and the second power-shift elements (K1, K2).

14. The double clutch transmission according to claim 13, wherein at least two gear stages (ZP3, ZPR) of the second subtransmission (11) are coupleable to the central transmission shaft (2) or the hollow transmission shaft (3), via a shared shift device (SE5),
one of the two gear stages (ZP3 or ZPR) is disposed, in an axial extension of the main transmission shaft (2) and relative to the assigned shift device (SE5), on a side of the shift device (SE5) which faces the first and the second power-shift elements (K1, K2), and the other gear stage (ZPR or ZP3) is disposed on a side of the shift device (SE5) which faces away from the first and the second power-shift elements (K1, K2).

15. The double clutch transmission according to claim 14, wherein idler gears (32, 13) of the at least two gear stages (ZP3, ZPR) of the second subtransmission (11) are disposed on one of the main transmission shaft (2), the hollow transmission shaft (3) and the countershaft (4), and are coupleable thereto via one of the plurality of shift device (SE5).

16. The double clutch transmission according to claim 13, wherein the further gearwheels (22, 61), which are connected in a rotationally fixed manner to the further hollow shaft (9A) which is disposed on the central transmission shaft (2) or the hollow transmission shaft (3), are disposed between the first and the second power-shift elements (K1, K2) and another gear stage (ZP4 or ZP8) of the first subtransmission (10), or the other gear stage (ZP4 or ZP8) of the first subtransmission (10).

17. The double clutch transmission according to claim 1, wherein at least one portion of an output drive (15, 16) of the double clutch transmission (1) is disposed coaxially to the countershaft (4).

18. The double clutch transmission according to claim 1, wherein at least one portion of an output drive (151, 161) of the double clutch transmission (1) is disposed coaxial to the main transmission shaft (2).

19. The double clutch transmission according to claim 1, wherein at least one portion of an output drive (151, 161) of the double clutch transmission (1) is disposed with axle offset with respect to the countershaft (4) and the main transmission shaft (2), the axle offset between the output drive (151, 161) of the double clutch transmission (1) and the countershaft (4) is implemented via a further gear stage (17), and the further gear stage (17) comprises a fixed gear (18) disposed on the countershaft, which is a fixed gear of a gear stage that is provided in order to implement a transmission ratio, or is another fixed gear.

20. The double clutch transmission according to claim 1, wherein five shift devices (SE1 to SE5) are provided, via which at least two gear stages ((ZP6, ZP2), (ZP2 or ZP6, ZP4 or ZP8), (ZP7, ZP5), (ZP5, ZP9), ZP3, ZPR)), respectively, can be engaged into the power flow.

21. The double clutch transmission according to claim 1, wherein eight gear planes (ZP2, ZP3, ZP4 or ZP8, ZP5, ZP6, ZP7, ZP9, ZPR) are provided, each of which comprises spur-gear stages having discrete transmission ratios ("2", "3", "4" or "8", "5", "6", "7", "9", "R").

22. The double clutch transmission according to claim 1, wherein at least nine transmission ratios ("1" to "9") for forward travel can be implemented by the double clutch transmission.

23. The double clutch transmission according to claim 1, wherein at least one transmission ratio ("R") for travel in reverse can be implemented by the double clutch transmission.

24. The double clutch transmission according to claim 1, wherein an electric machine is provided which is engagable into the power flow of the double clutch transmission (1).

25. The double clutch transmission according to claim 1, wherein the further hollow shaft supports three of the gear stages, another gear stage is coupleable or is connected to the central transmission shaft or the hollow transmission shaft via one of the plurality of shift devices, and an additional gear stage is coupleable to the central transmission shaft or the hollow transmission shaft via another one of the plurality of shift devices.

26. The double clutch transmission according to claim 1, wherein exactly five shift devices (SE1 to SE5) are provided via which at least two gear stages ((ZP6, ZP2), (ZP2, ZP4), (ZP7, ZP5), (ZP5, ZP9), (ZP3, ZPR); (ZP2, ZP6), (ZP6, ZP8), (ZP7, ZP5) (ZP5, ZP9), (ZP3, ZPR)), respectively, are engageable into the power flow.

27. A double clutch transmission (1) having a countershaft design, the double clutch transmission comprising:

a central transmission shaft (2), a hollow transmission shaft (3) disposed concentrically thereto, exactly one countershaft (4) and first and the second power-shift elements (K1, K2);

both of the power-shift elements (K1, K2) being operatively connectable on a drive side thereof to a drive assembly;

one of the first and the second power-shift elements (K1) being connected to the central transmission shaft (2);

the other of the first and the second power-shift elements (K2) being connected on an output side thereof to the hollow transmission shaft (3);

the central transmission shaft (2) and the hollow transmission shaft (3) being connectable to the countershaft (4) to implement a transmission ratio ("1" to "R") via gear stages (ZP2 to ZPR), which are engagable into and disengageable from a power flow via at least one of a plurality of shift devices (SE1 to SE5);

at least two gear stages ((ZP6, ZP2), (ZP2, ZP4), (ZP7, ZP5), (ZP5, ZP9), ZP3, ZPR); (ZP2, ZP6), (ZP6, ZP8) (ZP7, ZP5) (ZP5, ZP9) (ZP3, ZPR)) being assigned to each of the plurality of shift devices (SE1 to SE5);

at least nine transmission ratios ("1" to "9") for forward travel are implemented by engaging and disengaging the gear stages (ZP2 to ZPR); and at least three transmission ratios ("1", "8", "R"; "1", "4", "R") are implemented by engaging three gear stages ((ZP5, ZP9, ZP3), (ZP4, ZP2, ZP6), (ZP5, ZP9, ZPR); (ZP5, ZP9, ZP3), (ZP8, ZP6, ZP2), (ZP5, ZP9, ZPR)), respectively, on a shift-element side into the power flow, thereby enabling one transmission ratio ("2", "3", "4", "5", "6", "9"; "2", "3", "5", "6", "8", "9") to be at least partially implemented in each case by a respective sole engagement on the shift-element side into the power flow.

28. A double clutch transmission (1) having a countershaft design, the double clutch transmission comprising:

a central transmission shaft (2), a hollow transmission shaft (3) disposed concentrically thereto, exactly one countershaft (4) and first and the second power-shift elements (K1, K2);

both of the power-shift elements (K1, K2) being operatively connectable on a drive side thereof to a drive assembly;

one of the first and the second power-shift elements (K1) being connected to the central transmission shaft (2);

the other of the first and the second power-shift elements (K2) being connected on an output side thereof to the hollow transmission shaft (3);

the central transmission shaft (2) and the hollow transmission shaft (3) being connectable to the countershaft (4) to implement a transmission ratio ("1" to "R") via gear stages (ZP2 to ZPR), which are engagable into and disengageable from a power flow via at least one of a plurality of shift devices (SE1 to SE5);

at least two gear stages ((ZP6, ZP2), (ZP2, ZP4), (ZP7, ZP5), (ZP5, ZP9), ZP3, ZPR); (ZP2, ZP6), (ZP6, ZP8), (ZP7, ZP5), (ZP5, ZP9), (ZP3, ZPR)) being assigned to each of the plurality of shift devices (SE1 to SE5);

at least nine transmission ratios ("1" to "9") for forward travel are implemented by engaging and disengaging the gear stages (ZP2 to ZPR); and the central transmission shaft (2) only directly driving one of the plurality of shift devices (SE4) while the hollow transmission shaft (3) only directly driving one of the plurality of shift devices (SE4).

29. The double clutch transmission according to claim 28, wherein first and second hollow shafts (8A, 8B) are disposed on the countershaft (4) coaxially with one another, each of which can be coupled in a rotationally fixed manner, via one of the plurality of shift devices (SE1, SE3), to the countershaft (4), and to each of which at least two gearwheels (21 or 61, 41 or 81, 51, 91) of the gear stages (ZP2, ZP5) are connected in a rotationally fixed manner.

30. The double clutch transmission according to claim 28, wherein a further hollow shaft (9A) is provided on the central transmission shaft (2) or the hollow transmission shaft (3) and is disposed coaxially thereto, the further hollow shaft is connectable, via one of the plurality of shift devices (SE2), to the central transmission shaft (2) or the hollow transmission shaft (3), and at least two further gearwheels (22, 61) of the gear stages (ZP2, ZP6) are connected to the further hollow shaft (9A) in a rotationally fixed manner.

31. The double clutch transmission according to claim 28, wherein the central transmission shaft (2) or the hollow transmission shaft (3) has a sectional design, and a first transmission subshaft (2A) of the central transmission shaft (2) or the hollow transmission shaft is coupleable to a second transmission subshaft (2B) of the central transmission shaft (2) or the hollow transmission shaft via one of the plurality of shift devices (SE4), and one of the first and the second transmission subshafts (2A) is connected to an output side of one of the power-shift elements (K1), three of the gear stages (ZP9, ZP3, ZP6) are coupled to one transmission subshaft (2B), another gear stage (ZP7) is coupleable or is connected to the other transmission subshaft (2A), via one of the plurality of shift devices (SE4), and an additional gear stage (ZP5) is coupleable, via another one of the plurality of shift devices (SE4), to the other transmission subshaft (2B).

32. The double clutch transmission according to claim 31, wherein an additional hollow shaft (9B) being disposed on the central transmission shaft (2) or the hollow transmission shaft (3), the additional hollow shaft (9B) being coupleable thereto via one of the plurality of shift devices (SE4), and a gearwheel (71) of the further gear stage (ZP7) and the additional gear stage (ZP5) are each connected to the additional hollow shaft (9B) in a rotationally fixed manner.

33. The double clutch transmission according to claim 28, wherein at least one transmission ratio ("R") for travel in a reverse direction is implemented by engaging and disengaging the gear stages (ZP2 to ZPR).

34. The double clutch transmission according to claim 28, wherein eight gear planes (ZP2, ZP3, ZP4, ZP5, ZP6, ZP7, ZP9, ZPR; ZP2, ZP3, ZP5, ZP6, ZP7, ZP8, ZP9, ZPR) are provided, and each gear plane respectively comprises spur-gear stages which have discrete transmission ratios ("2", "3", "4", "5" "6", "7", "9", "R"; "2", "3", "5", "6", "7", "8", "9", "R").

35. The double clutch transmission according to claim 28, wherein an electric machine (20) is provided which is engageable into the power flow of the double clutch transmission (1).

* * * * *